(No Model.)   2 Sheets—Sheet 1.
W. R. KING.
AUTOMATIC BRAKE MECHANISM.
No. 446,386.  Patented Feb. 10, 1891.
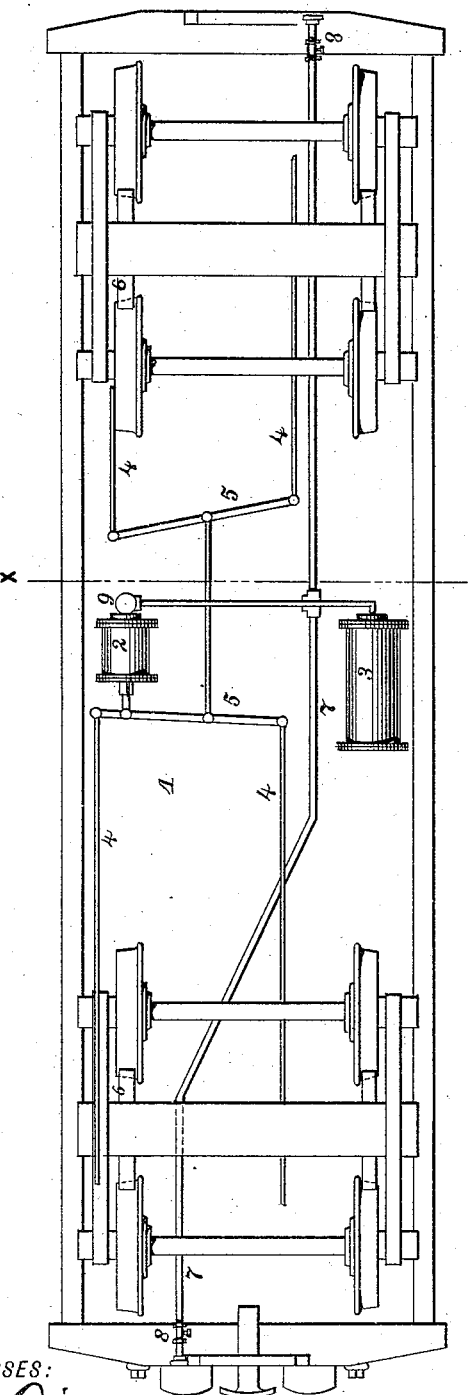
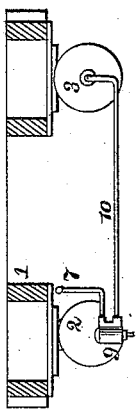
WITNESSES:
Gustave Dieterich
William Goebel
INVENTOR
William R. King
BY
Park Benjamin
his ATTORNEY.
THE NORRIS PETERS CO., PHOTO-LITHO., WASHINGTON, D. C.

(No Model.) 2 Sheets—Sheet 2.
W. R. KING.
AUTOMATIC BRAKE MECHANISM.
No. 446,386. Patented Feb. 10, 1891.
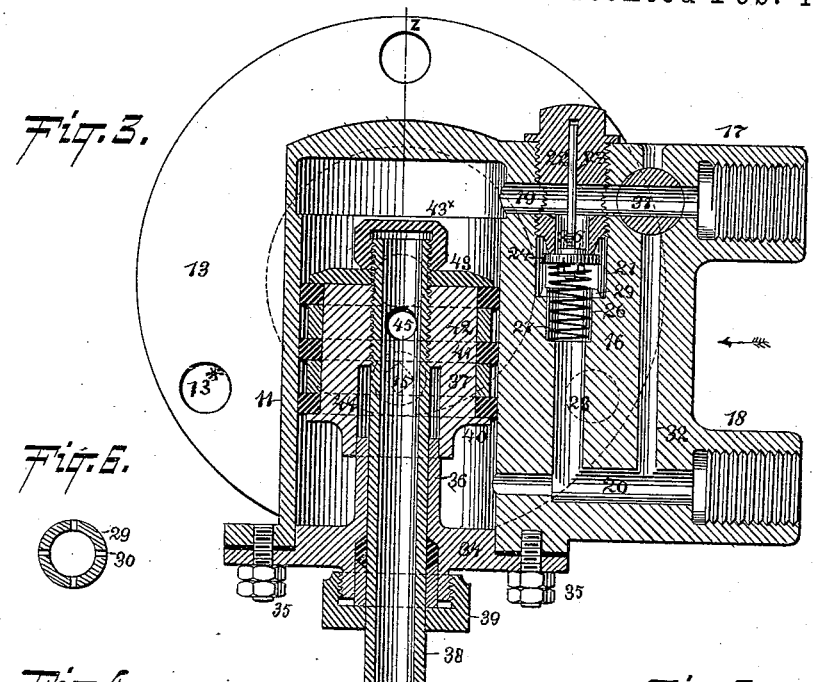
Fig. 3.
Fig. 6.
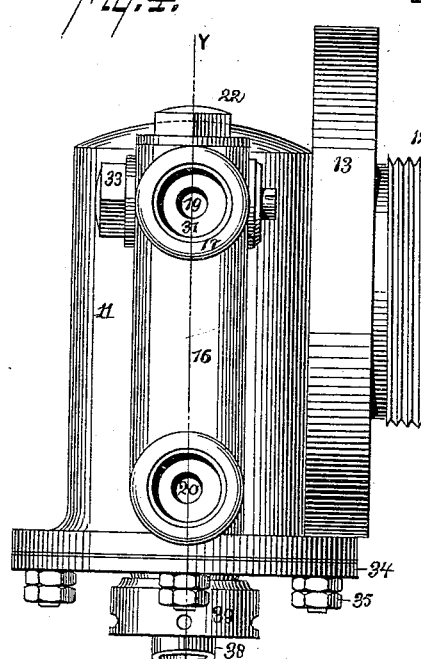
Fig. 4.
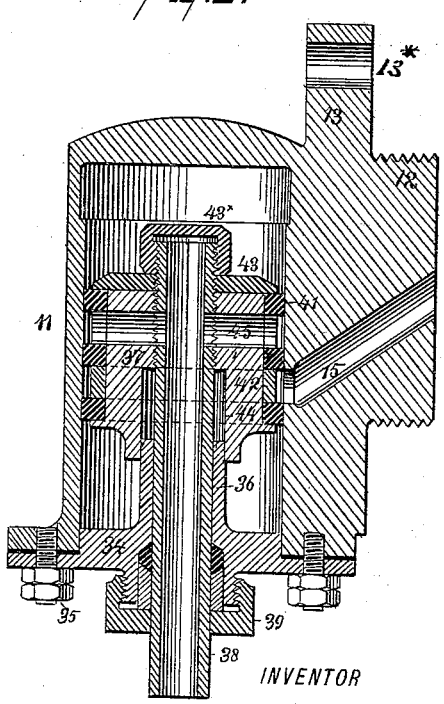
Fig. 5.
WITNESSES:
Gustave Dieterich.
William Goebel.
INVENTOR
William R King
BY Park Benjamin
his ATTORNEY.

UNITED STATES PATENT OFFICE.

WILLIAM R. KING, OF NEW YORK, N. Y., ASSIGNOR TO JAMES HERON CROSMAN, OF SAME PLACE.

AUTOMATIC BRAKE MECHANISM.

SPECIFICATION forming part of Letters Patent No. 446,386, dated February 10, 1891.

Application filed April 3, 1890. Serial No. 346,425. (No model.)

*To all whom it may concern:*

Be it known that I, WILLIAM R. KING, of the city, county, and State of New York, have invented a new and useful Improvement in Fluid-Pressure Automatic Brake Mechanism, of which the following is a specification.

My invention has for its object the application of the brake-shoes to the wheels of railway-cars by means of a simple mechanism actuated by fluid-pressure.

My invention relates to that class of fluid-pressure automatic brake mechanisms in which are employed a brake-cylinder, an auxiliary air-reservoir, a means of supplying fluid under pressure, such as compressed air, and a triple valve provided with a piston; and it consists in the construction and arrangement of said mechanism, as hereinafter described, and more particularly pointed out in the claims.

In the accompanying drawings, Figure 1 is a plan view of the bottom of the car, showing the usual and ordinary arrangement of an air-brake and the associated parts. Fig. 2 is a section on the line X X of Fig. 1, showing my triple valve in place on the brake-cylinder with its connections to the train-pipe and to the air-reservoir. Fig. 3 is a vertical section on the line Y Y of Fig. 4. Fig. 4 is an exterior side view of my valve, taken in the direction of the arrow in Fig. 3. Fig. 5 is a vertical section on the line Z Z of Fig. 3. Fig. 6 is a plan view of the valve-seat 29.

Similar numbers of reference indicate like parts.

Referring first to Fig. 1, 1 represents the car, 2 the brake-cylinder, and 3 the air-reservoir. The brake-cylinder has a piston which by its rod communicates with a system of rods 4 and levers 5 with the brake-shoes 6, which are applied to or released from the car-wheels as compressed air is admitted into or allowed to escape from said cylinder 2. 7 is the main air-pipe or train-pipe. It is provided with stop-cocks 8 near its ends and with flexible connections or couplings, so that it may be attached to the main air-pipe of the tender or of the adjacent car or cars of the train. At 9 is shown my triple valve, which is secured to the brake-cylinder 2, and to which are connected the train-pipe 7 and a pipe 10, which communicates with the auxiliary air-reservoir 3.

Referring to Figs. 3, 4, and 5, 11 is the valve chest or case. Cast integrally therewith is a threaded projection 12 and a circular flange 13. The projection 12 enters a similarly-threaded opening in the rear head of the brake-cylinder, and serves as a means of attachment of my triple valve to said cylinder. The flange 13 then comes into contact with the cylinder-head and is secured thereto. The valve-chest is further secured in place by bolts passing through the apertures 13* in the flange 13. In the valve-case 11 is bored a cylindrical chamber 14. Extending through the chest-wall and through the projection 12 is a passage 15, whereby communication is established between the interior of said chamber 14 and the brake-cylinder. The valve-case has also a projection 16, from which extend two smaller internally-threaded projections 17 and 18. The train-pipe 7 is connected to the projection 17, and the reservoir-pipe 10 to the projection 18. Extending through the projection 17 to the interior of the chamber 14 is a passage 19, and extending through the projection 18 and into said chamber is a passage 20. The passages 19 and 20 communicate with said chamber near opposite ends. In the projection 16 there is also a chamber 21 in which is inserted a screw-plug 22. The passage 19 extends through said plug. In the upper portion of said plug and above the passage 19 is a socket which receives the valve-rod 23. The said rod carries a valve 24, which has its seat against the lower end of the screw-plug 22. The valve 24 may be a disk of hard rubber. It is held between a collar 25 on the rod 23 and a nut received upon the threaded end of said rod. The valve 24 moves up and down in the lower portion of the chamber 21. At 26 the chamber 21 is contracted, so that a shoulder is formed, on which bears the spiral spring 27, which spring also bears against the valve 24. Finally, from the contracted portion 26 of chamber 21 to the passage 20 extends a vertical passage 28. The chamber 21 and passage 28 form a by-pass around the chamber 14. On the shoulder formed by the contraction of chamber 21 at 26 there is an annular projection 29, which serves as a seat for the valve when said valve is in its lowest position. In the valve-seat 29 are made one or more transverse indentations or recesses 30, Fig. 6, so that when the valve comes down upon its said seat a small amount of air may pass under the valve and so into the passage 28; also, in the projection 16 there is a vertical passage 32, extending from the passage 20 through said projection. This conduit may be closed by a switch-cock 31, said cock having an opening which may be turned either in line with the passage 19 or in line with the vertical passage 32. The stem of said cock extends transversely through the projection 16, and has on one end a squared head 33, to which a wrench may be applied in order to turn said cock.

The open end of the valve-chamber 14 is closed by the flanged head 34, secured in place by the bolts 35. This head is provided with a central fixed sleeve 36 on its inner side.

37 is the valve-piston, the hollow rod 38 of which extends through the sleeve 36 and the head 34. Where the piston-rod passes through the head 34 an ordinary stuffing-box 39 is provided. The valve-piston 37 consists of a central portion or body having a lower flange 40, upon which rest the three annular packing-rings 41 and the intermediate bull-rings 42. The packing-rings and bull-rings are secured in place by the cap 43. The piston-body is threaded internally to receive the threaded end of the piston-rod, and to the end of said rod the cap-nut 43* is applied. The piston-rod is hollow or tubular, and is open at its lowest extremity, but is closed by the nut 43 at its upper end. In the lower portion of the piston-body is formed a chamber 44, through which the piston-rod passes, and which receives the fixed sleeve 36 on the head 34. The object of the annular chamber thus formed at 44 is to act as an air-cushioning device, in which the air becomes compressed between the piston-body and sleeve 36 and so operates as a spring when the piston descends.

The operation of the apparatus is as follows: The parts being disposed as shown in Fig. 3, air is admitted at the train-pipe 7 from the usual air-compressing pump on the locomotive. The air-current then passes through the passage 19 and enters the valve-chamber 14 above the piston 37. At the same time it also forces the valve 24 down from its seat on the screw-plug 22, passes through the chamber 21 and passage 28, and enters the valve-chamber 14 at the opposite end and below the piston 37 through the passage 20. As the upper side of the piston 37 is of greater area than the lower side, the piston is forced downward and finally assumes a position at which the pressure of the air per square inch is equalized on both sides. Any excess of pressure due to the different areas of the opposite sides of the piston is finally balanced by the compression of the air in the annular chamber 44. The flow of air then goes on into the reservoir 3, and the parts will remain in the position last described so long as the air-pump on the locomotive is kept in operation, and afterward as long as the pressure in the train-pipe remains the same. This is the normal state of affairs while the train is running with the brakes off.

When it is desired to apply the brakes, the engineer reduces the pressure by operating the engineer's valve, so as to establish communication between the train-pipe and the atmosphere. The air-pressure from the reservoir then forces the check-valve 24 closely up against its seat in the screw-plug 22 and moves the piston 37 upwardly until the lowest packing-ring 41 comes above the port at the passage 15, and in this way communication is established between the valve-cylinder 14 through the passage 15 and into the brake-cylinder. The air from the reservoir then passes into the brake-cylinder through the passage 15, and moves the piston in said brake-cylinder so as to apply the brakes.

If the pressure in the train-pipe 7 has only been slightly reduced, as by a quick opening and closing of the engineer's valve, the expansion of the air in the brake-cylinder causes a reduction of the air-pressure on the lower side of the piston 37 until said pressure becomes less than the reduced pressure in the train-pipe. The piston 37 will then return to its normal position, closing the passage 15. If, however, there is a large reduction of air-pressure in the train-pipe, such as would occur if the engineer's valve were held open for some time, thus establishing communication between the train-pipe and the atmosphere, or through a breakage of the pipe-connection between the cars, or through leakage in or injury to the train-pipe, then the air-pressure from the reservoir, acting on the under side of the piston 37, will keep that piston in its elevated position above the passage 15, and hence an air-current will continuously flow until the pressure in both brake-cylinder and reservoir becomes equalized. In both the above cases it will be seen that the brake is put on and kept on. In the first case the parts return to their original position, closing the passage between brake-cylinder and valve-cylinder, and in the second case the parts do not return to their normal position and the passage 15 is kept open.

In order to release the brakes, the engineer either starts up his air-compressing pump or allows air to flow into the train-pipe from a main reservoir on the engine, such as is in common use. If this new air-supply is turned in instantly, its effect is to force the check-valve 24 closely against its seat 29, thus closing the passage 28. The whole of the increased pressure then comes above the piston 37, forcing it downward and compressing the air in the chamber 44 until an opening 45 in the hollow piston-rod 38 coincides with the passage 15. The air in the brake-cylinder then flows out through the passage 15 and through the hollow piston-rod into the outer atmosphere, so that there is no longer any pressure against the piston in the brake-cylinder, and the usual spring on the brakes causes them to become released. If, however, the increased pressure be turned in slowly, then the check-valve 24 is not forced closely against its seat 29, and a part of the air flows, as before, through the passages 28 and 20 and into the reservoir. In that case no difference of pressure is produced on opposite sides of the piston, which therefore remains quiet; but the air flows into the reservoir 3, so that in this way the reservoir may be charged while the brakes remain applied.

To sum up, therefore, the operation of my apparatus, broadly: First, the parts being in the condition shown in Fig. 3, the admission of air through the train-pipe first charges the reservoir; second, when the pressure is reduced in the train-pipe, the air flows into the brake-cylinder and moves the piston to apply the brakes, and, in accordance as a small or a large reduction of air-pressure is effected in the train-pipe, the brakes are applied in the one case by the expansion of a certain amount of air which has been admitted into the brake-cylinder from the reservoir and in the other by a continuous current of air flowing from reservoir into brake-cylinder; third, on producing an increased pressure in the train-pipe, the brakes being applied as aforesaid, if this augmented pressure is caused slowly, then air will flow from the train-pipe into the reservoir to recharge the same, and if it is produced quickly, then the piston will be moved so as to open the passage from the brake-cylinder through the hollow piston-rod, and thus the air will escape from the cylinder and the brakes will be released.

I have stated that in the valve-seat 29 are made transverse recesses or openings 30, so that even when the valve 24 comes closely down on its seat, the entire supply of air is not cut off from the passage 28. The object of these recesses is the following: If the valve 24 comes down closely on its seat 29, the pressure maintained above the valve will keep it down, so that it would become difficult for the engineer to again raise that valve in order to enable him to recharge his air-reservoir. The openings 30 in the seat under the valve allow of the air-pressure from the reservoir under the valve and the pressure in the train-pipe above it gradually to equalize. The spring 27 will then be free to lift the valve, so that in a short time the passage 28 will become open, and the recharging operation may then be done. The object of the cock 31 is to allow of the entire device being cut out of operation, as when a car is detached from a train. When said cock is turned at right angles to the position shown in Fig. 3, then no air can enter from the train-pipe; but there will be free escape of air from the reservoir and from the brake-cylinder through the passage 20 and into the atmosphere.

I claim—

1. In a brake mechanism, the combination of a valve-cylinder having a piston-valve, a main air-pipe communicating with said cylinder near one end, an auxiliary air-reservoir communicating with said cylinder near the opposite end, a brake-cylinder communicating with said valve-cylinder between the air-pipe and auxiliary-reservoir ports, and a by-pass outside of said cylinder and extending between said air-pipe and said reservoir, the aforesaid parts being constructed and operating so that when air is admitted into said valve-cylinder said piston assumes a position to close the port communicating with the brake-cylinder, and thereby causes the air-current to pass wholly through the by-pass from the air-pipe to the reservoir.

2. In a brake mechanism, the combination of a valve-cylinder having a piston-valve, a main air-pipe communicating with said cylinder near one end, an auxiliary air-reservoir communicating with said cylinder near the opposite end, a brake-cylinder communicating with said valve-cylinder between the air-pipe and auxiliary-reservoir ports, and a by-pass outside of said cylinder and extending between said air-pipe and said reservoir, the aforesaid parts being constructed and operating so that when air is admitted to said valve-cylinder from said air-pipe said piston assumes a position to close the port between the valve-cylinder and brake-cylinder, and thereafter when air is allowed to escape from said air-pipe said piston assumes a position to open communication between said valve-cylinder and said brake-cylinder.

3. In a brake mechanism, the combination of a valve-cylinder and piston-valve therein, a main air-pipe and an auxiliary reservoir communicating with said valve-cylinder near opposite ends thereof, a brake-cylinder communicating with said valve-cylinder between the air-pipe and reservoir-ports, a by-pass outside of said cylinder and extending between said pipe and said reservoir, and a check-valve arranged in said by-pass and held to its seat by a spring constructed to yield and so allow the valve to open only at a determinate pressure, the aforesaid parts being constructed and arranged so that when air is admitted to said valve-cylinder said piston therein first closes communication between said cylinder and brake-cylinder, and then the accumulated pressure, acting on said check-valve in said by-pass, overcomes the opposing spring-pressure, so lifting said valve and establishing communication between the air-pipe and reservoir.

4. In a brake mechanism, the combination of a main air-pipe, an auxiliary reservoir, a brake-cylinder, a by-pass outside of said cylinder and extending between said air-pipe and said reservoir, a check-valve in said by-pass, and a triple valve having a piston, the aforesaid parts being constructed and arranged so that when air is admitted to said triple valve from said air-pipe said piston assumes a position to close communication between said valve and said brake-cylinder and establish communication through said by-pass between said air-pipe and said reservoir, and thereafter when air is allowed to escape from said air-pipe said piston assumes a position to open communication between said triple valve, said brake-cylinder, and said reservoir, and said check-valve closes said by-pass and so cuts off communication between said reservoir and said air-pipe.

5. In a brake mechanism, the combination of a main air-pipe, an auxiliary reservoir, a brake-cylinder, a by-pass between said air-pipe and said reservoir, a check-valve in said by-pass, and a triple valve having a piston, the aforesaid parts being constructed and arranged so that when air is admitted to said triple valve from said air-pipe said check-valve closes said by-pass and said piston assumes a position to open communication between said brake-cylinder and the atmosphere.

6. The combination, in a triple-valve device, of a case or chest, a piston working in a chamber therein, a port or passage communicating with said chamber and with an air-brake cylinder, and a hollow piston-rod open at one end to the atmosphere, there being a transverse aperture through said piston and rod, the said piston working in said chamber to bring said aperture into and out of coincidence with said port or passage.

7. The combination, in a triple-valve device, of a case or chest, a piston working in a chamber therein, a port or passage communicating with said chamber and with an air-brake cylinder, and a hollow piston-rod open at one end to the atmosphere, there being a transverse aperture through said piston and rod, the said piston governing the opening of said port or passage into said chamber, and also governing the opening of said transverse aperture into said hollow rod.

8. The combination, in a triple-valve device, of a case or chest, a piston working in a cylindrical chamber therein, passages communicating, respectively, with an air-pipe and an air-reservoir and entering said cylinder respectively above and below said piston, a by-pass outside of said cylinder and extending between said passages, and a check-valve arranged in said by-pass and provided with a spring whereby it is normally held in a closed position.

9. The combination, in a triple-valve device, of a case or chest, a piston working in a cylindrical chamber therein, passages communicating, respectively, with an air-pipe and an air-reservoir and entering said cylinder respectively above and below said piston, a passage communicating with a brake-cylinder and entering said valve-cylinder about midway its length, a by-pass outside of said cylinder extending between the passages leading to the air-pipe and air-reservoir, and a check-valve arranged in said by-pass and provided with a spring whereby it is normally held in closed position.

10. The combination, in a triple-valve device, of a case or chest, a piston working in a cylindrical chamber therein, passages communicating, respectively, with an air-pipe and an air-reservoir and entering said main cylinder respectively above and below said piston, a by-pass extending between said passages, and a check-valve arranged in said by-pass and having a seat above and a seat below and held against its upper seat by the action of a spring, the aforesaid parts being so operated and arranged that on a certain air-pressure being exerted upon said check-valve through said air-pipe the said valve is lifted or moved away from its upper seat to allow said air to pass through said by-pass, and so that on a certain increased pressure in said air-pipe said valve is moved over against its lower seat, thereby closing said by-pass.

11. The combination, in a triple-valve device, of the case or chest 11, containing the chamber 14 and piston 37 therein, the ports or passages 15, 19, and 20, communicating with said chamber, the by-pass 28, extending between passages 19 and 20 and disposed wholly outside of the chamber 14, containing the valve-chamber 21, the valve 24 in said chamber, and means for normally holding said valve in position to close said by-pass.

12. The combination, in a triple-valve device, of the case or chest 11, containing the chamber 14 and piston 37 therein, the ports or passages 15, 19, and 20, communicating with said chamber, the by-pass 28, containing the valve-chamber 21, hollow removable plug 22, entering said chamber, and the valve 24 in said chamber 21, having its seats respectively against the end of said plug and the bottom of said chamber.

13. The combination, in a triple-valve device, of the case or chest 11, containing the chamber 14 and piston 37 therein, the hollow piston-rod 38, open at one end to the atmosphere, there being a transverse aperture through said piston and rod, the ports or passages 15, 19, and 20, communicating with said chamber, the by-pass 28, and the check-valve 24 in said by-pass.

14. The combination, in a triple-valve device, of a case or chest 11, containing the chamber 14 and piston 37 therein, the ports or passages 19 and 20, communicating with said chamber near the ends thereof, the passage 32, extending between said passages 19 and 20, and the two-way cock 31 in passages 19 and 32.

15. The combination, in a triple-valve device, of the case or chest 11, containing the chamber 14, and piston 37 therein, the ports or passages 19 and 20, communicating with said chamber, the by-pass 28, valve-chamber 21 in said by-pass, valve 24 in said chamber, and two annular valve-seats projecting into said chamber respectively above and below said valve.

WILLIAM R. KING.

Witnesses:
   ISAAC DAVEGA,
   D. D. ROGERS.